No. 789,803. PATENTED MAY 16, 1905.
F. M. GARRISON.
PRUNING IMPLEMENT.
APPLICATION FILED FEB. 17, 1904.
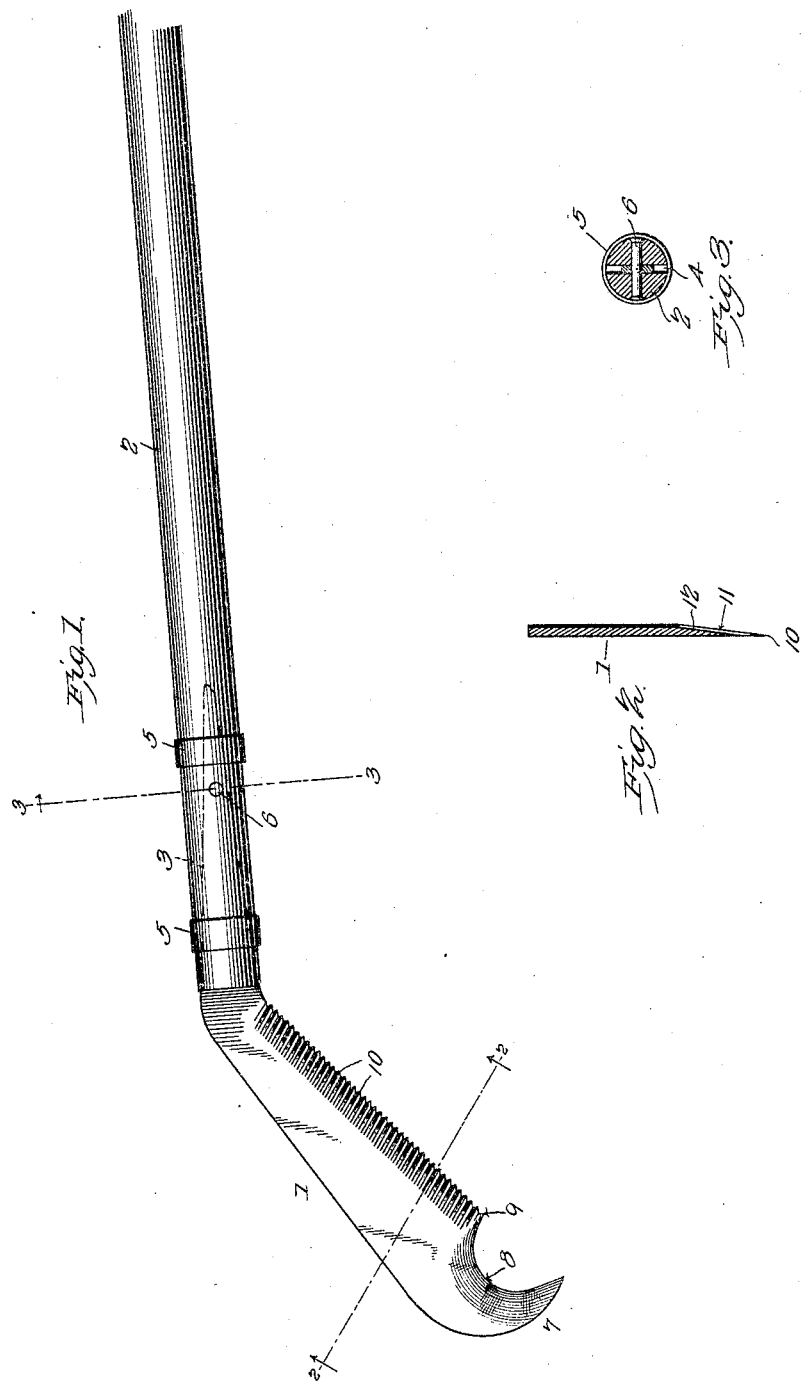
Frances M. Garrison, Inventor No. 789,803.

Patented May 16, 1905.

UNITED STATES PATENT OFFICE.

FRANCIS M. GARRISON, OF BERRIEN CENTER, MICHIGAN, ASSIGNOR OF ONE-HALF TO JOHN A. RUTTER, OF BERRIEN CENTER, MICHIGAN.

PRUNING IMPLEMENT.

SPECIFICATION forming part of Letters Patent No. 789,803, dated May 16, 1905.

Application filed February 17, 1904. Serial No. 194,058.

*To all whom it may concern:*

Be it known that I, FRANCIS M. GARRISON, a citizen of the United States, residing at Berrien Center, in the county of Berrien and State of Michigan, have invented a new and useful Pruning Implement, of which the following is a specification.

This invention relates to pruning implements adapted more particularly for trimming and pruning berry-vines, fruit-trees, and other vegetation, and has for its object to present a simply-constructed, highly-durable, and thoroughly efficient device for the purpose stated.

The pruning implement of the present invention presents a combined hook and knife. The hook is provided with a plain cutting edge and is adapted more particularly for cutting close to the ground, and the knife is provided with a sinuous or saw-toothed cutting edge the teeth of which are pitched toward the handle, whereby to prevent a limb or branch to be severed from slipping away from the knife, the knife being adapted more particularly for use in lopping or cutting off branches of trees or vines that are above the ground.

With these and other objects in view, as will appear as the nature of the invention is better understood, the same consists in the novel construction and combination of parts of a pruning implement, as will be hereinafter fully described, and specifically pointed out in the claim.

In the accompanying drawings, forming a part of this specification, and in which like numerals of reference indicate corresponding parts, there is illustrated a form of embodiment of the invention capable of carrying the same into effect, it being understood that the elements herein exhibited may be varied or changed as to shape, proportion, and exact manner of assemblage without departing from the scope of the invention.

In the drawings, Figure 1 is a view in elevation, exhibiting a pruning implement constructed in accordance with the invention. Fig. 2 is a view in transverse section through the blade, taken on the line 2 2, Fig. 1. Fig. 3 is a view in transverse section, taken on the line 3 3, Fig. 2.

Referring to the drawings, 1 designates the blade of a knife, and 2 the handle. The shank 3 of the blade (indicated by dotted lines in Fig. 1) is in this instance associated with the handle 2 by providing one end of the latter with a longitudinal slot 4 to receive the shank and then passing clamping-collars 5 around the slotted portion, thereby not only to hold the shank firmly combined with the handle, but also to permit of the knife being used for hacking or chopping without danger of disconnecting it from the handle. In addition to the clamping-collars 5 a rivet or bolt 6 is employed, which passes through the handle and through the shank. While this manner of securing the blade to the handle will be found thoroughly effective in use, it is to be understood that the invention is not to be limited to this exact manner of assembling the parts, as it will be obvious that various other ways of accomplishing the same result may be employed and still be within the scope of the invention. The blade portion of the knife is bent at such angle to the shank as will produce the most effective results in use and is provided at its outer extremity with a hawkbill or hook 7, the incurved edge of which is sharpened to a cutting edge, as shown at 8, and from the inner terminal 9 of the hook the knife-edge is straight back to a point adjacent to the handle and has this edge provided with serrations or teeth 10, which are raked or pitched toward the handle, thereby in operation presenting an effective means for grasping or clinging to the limb to be severed. The teeth are formed by providing the blade with transverse depressions 11, preferably V-shaped in cross-section, the face of the knife in which these depressions are arranged being beveled to the remainder of the blade, as shown at 12 in Fig. 2. The back of the blade is flat, so that when the teeth of the knife become dull from use they may readily be sharpened by grinding the back or flat side of the blade. As herein shown, the depressions 11 extend backward from the cutting edge a distance equal approximately to one-half of the width of the blade near the shank and one-fourth the width of the blade near the hook; but it is to be understood that these depressions may be disposed across any desired width of the blade, according as may be found necessary or desirable in the use of the implement.

As before stated, where the branches of a vine that lie close to the ground are to be pruned the hook portion of the knife will be employed, while where the branches of a vine or the limbs of a tree above the ground or overhead are to be pruned the knife portion of the blade will be employed.

By reason of the rake of the teeth of the knife portion this implement will be found particularly useful in pruning overhead limbs, as the teeth will bite into the limb, and thus effect its rapid severing.

Having thus fully described the invention, what I claim as new, and desire to secure by Letters Patent, is—

A pruning implement comprising a handle and a blade, the blade being of gradually-increasing width from the handle to its free end, the latter being formed into a hawkbill-hook, the blade being flat on one side and having a portion of its opposite side beveled to an edge, the beveled portion being provided with grooves or depressions extending transversely of the blade, and forming at one edge thereof a sinuous or saw-toothed cutting edge.

In testimony that I claim the foregoing as my own I have hereto affixed my signature in the presence of two witnesses.

FRANCIS M. GARRISON.

Witnesses:
J. J. MURPHY,
B. H. RUTTER.